United States Patent Office 3,536,766
Patented Oct. 27, 1970

3,536,766
STABILIZED METHYL CHLOROFORM
COMPOSITION
Riley F. Mogford, Lake Jackson, Tex., assignor to The Dow Chemical Company, Midland, Mich., a corporation of Delaware
No Drawing. Filed Dec. 26, 1968, Ser. No. 787,228
Int. Cl. C07c 17/40, 17/42
U.S. Cl. 260—652.5                                                                 5 Claims

ABSTRACT OF THE DISCLOSURE

Methyl chloroform is stabilized against degradation in the presence of zinc and aluminum by the addition of a minor amount of 3 - methoxy-1,2-epoxypropane. The presence of additional stabilizing quantities of nitromethane and 1,4-dioxane provides protection in the presence of other metals such as iron and brass.

BACKGROUND OF THE INVENTION

The present invention relates generally to methyl chloroform compositions stabilized against corrosion of metals of construction and it relates particularly to such compositions inhibited against corrosion of zinc and zinc alloys.

Methyl chloroform has been increasingly used in recent years in dry cleaning, dewaxing of oils, and particularly in metal degreasing and cleaning processes because of its relatively low toxicity and excellent solvent properties. The use of this solvent, however, has been complicated by its unusual reactivity with certain metals, notably aluminum, as compared to other chlorinated solvents. In order to prevent the reaction with aluminum and the consequent decomposition of the solvent, inhibitors such as phenols, alkanols, acetylenic alcohols, heterocyclic ethers, and other compounds have been added to methyl chloroform. Combinations of inhibitors such as 1,4-dioxane and nitromethane have been found to be particularly effective for this purpose.

Unfortunately, the use of such inhibitors often introduces new problems. For example, in metal degreasing operations, the solvent and its vapors commonly are in contact with a variety of metals including steel, aluminum, brass, zinc, and galvanized steel because of the equipment used and the nature of the articles cleaned. In the presence of zinc and galvanized steel, methyl chloroform containing inhibitors to protect against reaction with aluminum characteristically shows enhanced reactivity as compared to the pure solvent which is slow to react with zinc. Aliphatic epoxides such as butylene oxide, pentene oxide and cyclohexene oxide have been used as an additional inhibitor component to prevent the reaction with zinc.

SUMMARY OF THE INVENTION

It has now been discovered that methyl glycidyl ether (3-methoxy-1,2 - epoxypropane) will stabilize methyl chloroform in the presence of both zinc and aluminum more effectively than the epoxides previously used. It is further effective to inhibit the degradation of the methyl chloroform in the presence of other metals when used in combination with nitromethane and dioxane.

DETAILED DESCRIPTION

The relative proportions of 1,4-dioxane, nitromethane, and methyl glycidyl ether to be used as a multicomponent inhibitor combination in methyl chloroform compositions are essentially those of the similar epoxide-containing compositions described by Brown et al., U.S. 3,049,571. Conventionally, 1,4-dioxane and nitromethane are employed in quantities of 0.5–10 percent and 0.01–3 percent respectively based on the weight of solvent composition although any significant amount of both compounds has some stabilizing effect.

Similarly, the methyl glycidyl ether can be used in any significant quantity to obtain at least some inhibition of the zinc reaction. A concentration of 0.01–5 percent by weight is appropriate and a concentration within the range of 0.1–1.5 percent is preferred.

The addition of methyl glycidyl ether alone to methyl chloroform is effective as shown in the examples. The superior stabilizing properties of methyl glycidyl ether as compared to other epoxides generally and to other glycidyl ethers specifically are particularly evident under severe operating conditions, for example, in pressurized operations where the temperature significantly exceeds the atmospheric boiling point of the solvent. When used alone, however, it is necessary to use larger amounts of the stabilizer, e.g. 0.3 to 5.0 percent are preferred.

The following examples illustrate the practice and advantage of the invention but are not to be construed as limiting.

EXAMPLE 1

A clean strip of pure zinc 12 mm. x 2 mm. x 0.2 mm. was sealed in a glass ampoule with 1 ml. of the methyl chloroform solvent composition to be tested and the sealed ampoule was heated in an oil bath at 175° C. until reaction of the zinc was indicated by the appearance of a dark spot or coating on the metal and discoloration of the solvent. The time in minutes for reaction to occur in each case was noted. The ampoule was then cooled and opened to determine whether HCl was present. Results of these tests are listed in the following table. Quantities are in volume percent of the total composition.

| Stabilizer | Time for reaction, min. | Observation |
| --- | --- | --- |
| None | 95 | Zn black, HCl present. |
| 0.5% methyl glycidyl ether | 480+ | Zn still bright. |
| 0.5% ethyl glycidyl ether | 125 | Zn black; HCl present. |
| 0.5% butylene oxide | 80 | Do. |
| 0.5% epichlorohydrin | 80 | Do. |
| 0.5% cyclopentene oxide | 70 | Do. |
| 2.5% 1,4-dioxane | 10 | Do. |
| 2.5% 1,4-dioxane+0.5% nitromethane. | 15 | Do. |

EXAMPLE 2

The test procedure of Example 1 was repeated using a dioxane-nitromethane combination with various epoxides as three component stabilizers in the methyl chloroform.

| Stabilizer | Time for reaction, min. | Observation |
| --- | --- | --- |
| 2.5% 1,4-dioxane<br>0.5% nitromethane<br>0.5% methyl glycidyl ether | 300 | Zn still bright. |
| 2.5% 1,4-dioxane<br>0.5% nitromethane<br>0.5% butylene oxide | 60 | Zn black, HCl present. |
| 2.5% 1,4-dioxane<br>0.5% nitromethane<br>0.5% epichlorohydrin | 60 | Zn black, HCl present. |

EXAMPLE 3

A strip of 2024 aluminum alloy was submerged in unstabilized methyl chloroform at 25° C. and scratched several times with a sharp instrument. There was an immediate reaction in which gas was evolved (HCl and vinylidene chloride) and a reddish brown "bleeding" occurred from the scratched aluminum. The entire sample soon turned into an acid smelling resinous mass of material. When 4% (vol.) of methyl glycidyl ether was added to the unstabilized methyl chloroform the composition remained clear and colorless and the aluminum which had been scratched remained bright and shiny.

When this test was conducted on methyl chloroform combined with 4% of any one of butylene oxide, epichlorohydrin and cyclopentene oxide the result was identical with that of the unstabilized methyl chloroform.

EXAMPLE 4

Additional tests were made as in Example 3 wherein closely related compounds were combined with methylchloroform. The mixtures of methyl chloroform with each of methyl propyl ether, methylbutyl ether and ethyl glycidyl ether each failed to be stable under the conditions of the "scratch" test reported in Example 3. Thus, it can be seen that methyl glycidyl ether is unique in its ability to stabilize methyl chloroform.

What is claimed is:

1. A chlorinated solvent composition stabilized against degradation in the presence of zinc or aluminum, consisting essentially of methyl chloroform and a small but stabilizing amount of methyl glycidyl ether.

2. The composition of claim 1 wherein the concentration of the methyl glycidyl ether is from 0.3 to 5.0 volume percent of the composition.

3. Methyl chloroform containing stabilizing amounts of 1,4-dioxane and nitromethane and having dissolved therein a stabilizing concentration of methyl glycidyl ether.

4. The composition of claim 3 wherein the methyl glycidyl ether is present at a concentration of from about 0.01–5.0 volume percent of the composition.

5. The composition of claim 3 wherein there is present 0.5–10 percent of 1,4-dioxane, 0.01–3 percent of nitromethane, and 0.01–5.0 percent of methyl glycidyl ether based on the total weight of the composition.

References Cited

UNITED STATES PATENTS

| | | | |
|---|---|---|---|
| 2,923,747 | 2/1960 | Rapp | 252—171 XR |
| 3,031,410 | 4/1962 | Petering et al. | 260—652.5 XR |
| 3,049,571 | 8/1962 | Brown | 260—652.5 XR |
| 3,260,760 | 7/1966 | Domen et al. | 260—652.5 |
| 3,397,246 | 8/1968 | Ryckaert et al. | 260—652.5 |
| 3,445,532 | 5/1969 | Richtzenhain et al. | 260—652.5 |

HOWARD T. MARS, Primary Examiner

U.S. Cl. X.R.

252—171, 405, 407